United States Patent

Takenaka et al.

[11] Patent Number: 4,777,407
[45] Date of Patent: Oct. 11, 1988

[54] COLOR CATHODE RAY TUBE DEVICE

[75] Inventors: Shigeo Takenaka; Eiji Kamohara; Takashi Nishimura, all of Fukaya, Japan

[73] Assignee: Kabushiki Kaisha Toshiba, Kawasaki, Japan

[21] Appl. No.: 3,420

[22] Filed: Jan. 15, 1987

[30] Foreign Application Priority Data

Jan. 22, 1986 [JP] Japan .................................. 61-10000

[51] Int. Cl.⁴ ............................................ H01J 29/98
[52] U.S. Cl. ......................................... 315/9; 313/2.1;
 313/413; 313/427
[58] Field of Search ...................... 315/9; 313/2.1, 409,
 313/411, 413, 426, 421, 427, 431; 340/568

[56] References Cited

U.S. PATENT DOCUMENTS

| | | | |
|---|---|---|---|
| 3,071,706 | 1/1963 | Waldorf | 313/2.1 |
| 3,184,630 | 5/1965 | Geer | 315/9 X |
| 3,694,686 | 9/1972 | Harao et al. | 313/427 |
| 3,928,785 | 12/1975 | Standaart | 313/413 |
| 4,063,233 | 12/1977 | Rowe | 313/413 |
| 4,292,563 | 9/1981 | Gabbay et al. | 313/413 |

Primary Examiner—David K. Moore
Assistant Examiner—Michael Razavi
Attorney, Agent, or Firm—Oblon, Fisher, Spivak, McClelland & Maier

[57] ABSTRACT

A color cathode ray tube includes a screen, a shadow mask and an electron gun section. The electron gun section comprises a plurality of separate unit electron guns. The screen is divided into a plurality of subregions each of which is scanned by an individual unit electron gun. Each unit electron gun emits a single electron beam and is associated with an individual main deflection device for causing the beam to scan the electron gun's particular subregion of the screen and subsidiary deflection means for effecting electron beam color switching.

5 Claims, 8 Drawing Sheets

COLOR CATHODE RAY TUBE DEVICE

BACKGROUND OF THE INVENTION

The present invention relates to a color cathode ray tube device in which the screen section is divided into a plurality of subregions which are separately scanned.

In recent years there has been considerable research aimed at meeting demands relating to high definition color cathode ray tubes or associated large-screen high resolution color cathode ray tubes. One requirement for achieving higher resolution in such tubes is that the electron beam spot on the screen be made smaller. There have also been efforts in the past to improve the electron gun electrode structure and to lengthen and increase the size and aperture of actual electron guns, but results achieved so far have been unsatisfactory. The main reason for this is that the electron gun-to-screen distance becomes larger as a cathode ray tube becomes larger. Thus, the electron lens magnification becomes too large. Accordingly, reducing the electron gun to screen distance is an important aspect of achieving high resolution. Methods for wide-angle deflection are not practical for this purpose, since they result in an increased difference in magnification between central and peripheral portions of the screen.

In the past a system has been proposed for high resolution, large-screen displays in which a plurality of small sized color cathode ray tubes are disposed in horizontal and vertical directions. Such a system is described in Japanese Patent Disclosure No. 48-90428, Japanese Patent Disclosure No. 49-21019 and Japanese Utility Model Disclosure No. 53-117130, etc. A system such as this is effective for very large screen displays such as outdoor displays, etc. that are divided into a large number of portions. However, it is obvious that in an intermediate-scale large-screen display with a screen size of about 40 inches, this system results in reproduction of an image that is uncomfortable to view, since the joints between the images of different regions are visible, due to imprecise alignment of the images. In particular, it is a significant drawback if joints are visible when the system is used in drawing display terminals for computer-aided design.

In response to this drawback, a structure in which the screens of a plurality of horizontally disposed, independent CRT's are combined into a unitary screen section has been proposed in Japanese Utility Model Publication No. 39-25641, Japanese Patent Publication No. 42-4928 and Japanese Patent Disclosure No. 50-17167. A color cathode ray tube employing a multi-neck system with a unitary screen structure such as this makes it possible to produce an image that is easy to view, since it eliminates the joints between adjacent cathode ray tubes which occur with an array of independent color cathode ray tubes, as described above. However, since the separate scanning regions are extremely close to one another, slight differences in brightness, contrast or hue, etc. become apparent.

Although most people find it difficult to assess images in terms of absolute values, they are very sensitive to relative values and are therefore very conscious of relative differences in the hue, etc. of two images that are placed very close together.

Thus, a multi-neck color cathode ray tube with a unitary screen structure has a major drawback in that it is necessary to have perfectly matching brightness, contrast or hue, etc. in each subregion. In practical terms, the complexity of adjustment and the number of adjustments needed, make this extremely difficult to achieve.

When color displays are provided by tubes such as this, in which the screen section is a unitary section and divided scanning is effected, a color cathode ray tube employing a shadow mask system for color selection permits simple, but sure, color selection and is very practical. The tube with a shadow mask system has the advantage that it does not need the extremely high frequency color switching that is required in an indexing type color cathode ray tube.

However, in color cathode ray tubes employing shadow mask systems that are in general use, three electron guns are provided in a single neck for producing three electron beams in correspondence to red, green and blue phosphors coated on a screen. The practicality of a color display apparatus that is provided with a plurality of such tubes to obtain a unitary screen structure is highly doubtful, since inconsistencies in manufacturing result in non-uniform current emission characteristics (drive characteristics) of the three electron guns. Achievement of perfect matching of the brightness, contrast or hue in the different subregions involves a massive number of adjustments.

SUMMARY OF THE INVENTION

An object of this invention is to provide a color cathode ray tube device with a screen section divided into a plurality of subregions in which is highly practicable, since it simplifies the procedure for adjustment of brightness, contrast of hue, etc. of the different subregions and reduces the number of adjustments needed.

In accordance with this invention, there is provided a color cathode ray tube device including a color cathode ray tube with a unitary screen divided into a plurality of subregions and an electron gun section provided with a plurality of unit electron guns, each generating a single electron beam. The screen section is divided into a plurality of subregions corresponding to each of the unit electron guns and each subregion is separately scanned by the electron beams from one unit electron gun. A mask section is arranged facing the screen section and provided with apertures allowing passage of the electron beams.

Main deflection means has a plurality of main deflection devices respectively provided in the vicinity of each of the unit electron guns for causing separate scanning of the subregion by the single electron beam from the unit electron gun.

Subsidiary deflection means has auxiliary deflection devices respectively provided in the vicinity of each of the unit electron guns for deflecting the single electron beam to select a position of the electron beam in a deflection center of the main deflection device for effectively making the single electron beam into a plurality of electron beams.

DESCRIPTION OF THE PREFERRED EMBODIMENTS

Figure 1:
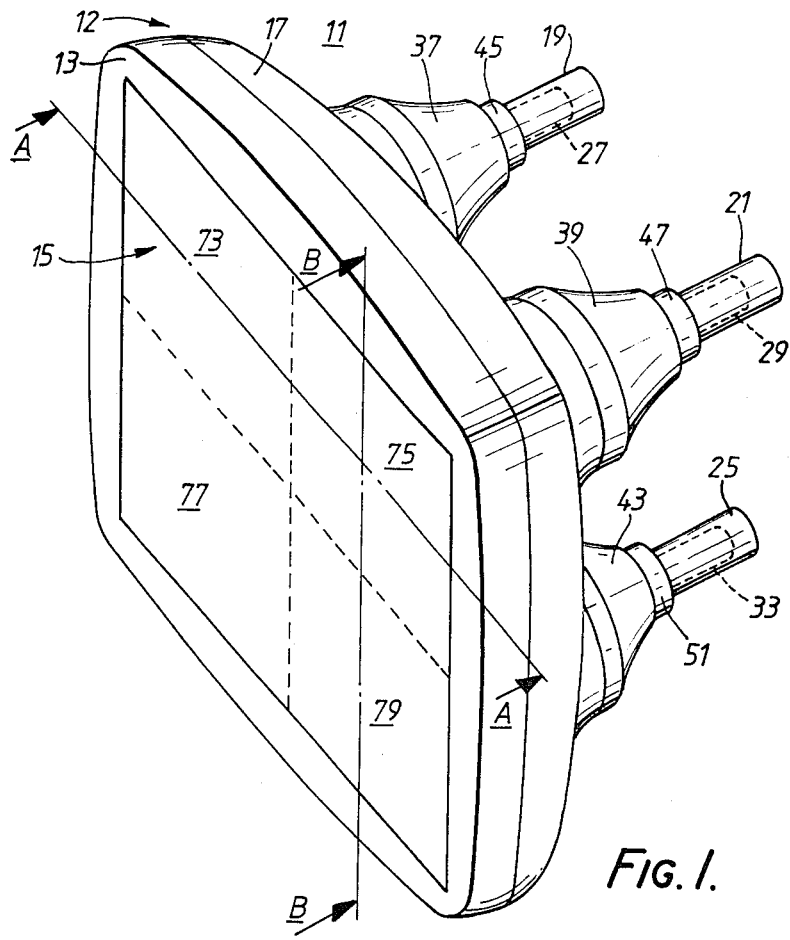
FIG. 1 is a schematic perspective view of a color cathode ray tube device, according to one embodiment of the invention.
Figure 2:
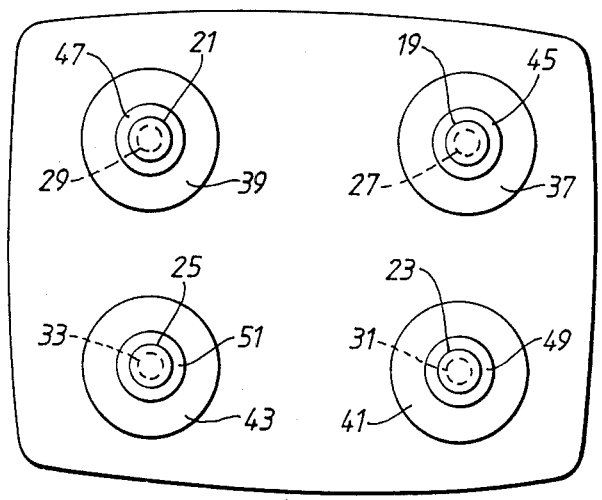
FIG. 2 is a rear elevation of FIG. 1.
Figure 3:
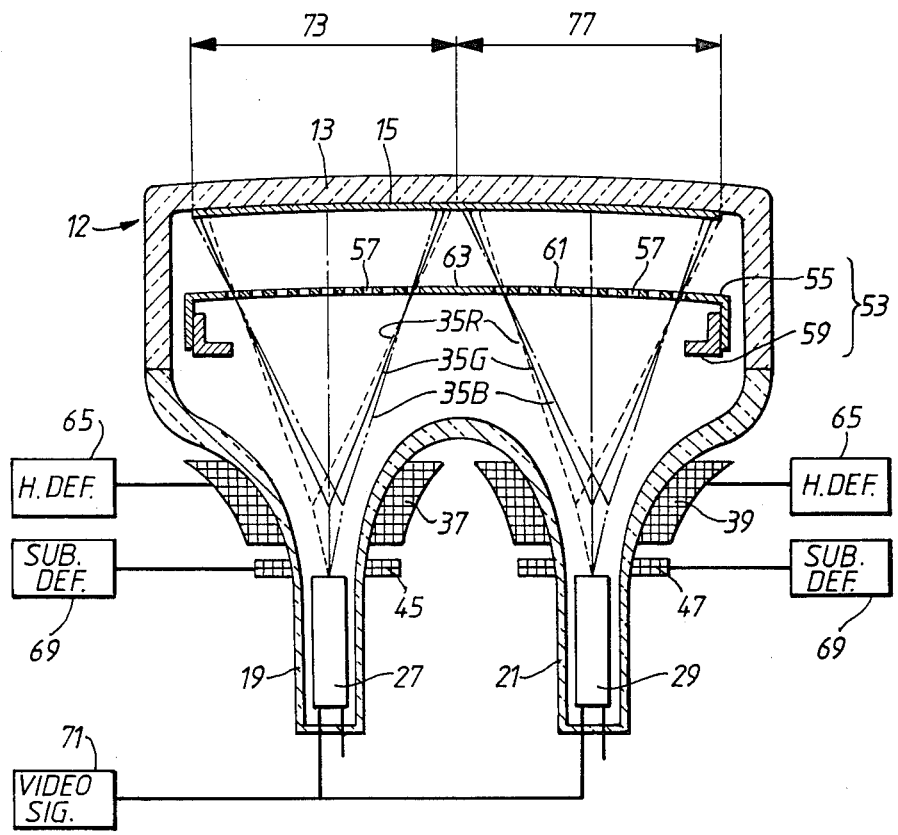
FIG. 3 is a cross-sectional view taken along A—A of FIG. 1.
Figure 4:
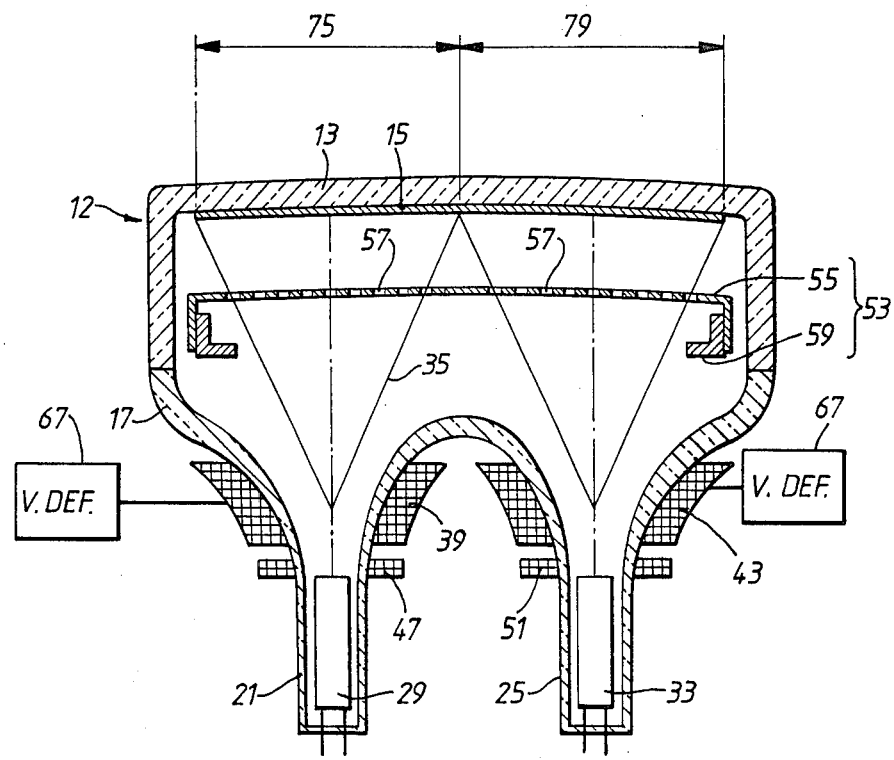
FIG. 4 is a cross-sectional view taken along B—B of FIG. 1.

Referring now to FIGS. 1 to 4, a color cathode ray tube device 11 has an envelope 12 comprising a face plate 13 with a screen 15 and plurality of necks 19, 21, 23 and 25 that are connected to the sidewall portion of face plate 13 via a funnel 17. Each neck 19, 21, 13 and 25 has provided therein a single electron gun 27, 29, 31, 33, respectively, which emits a single electron beam 35, and on the outer wall extending from each neck to the funnel there is a main deflection yoke 37, 39, 41, 43 and an auxiliary deflection yoke 45, 47, 49 or 51. The device also has a mask section 53 comprising a shadow mask 55 installed facing and at a predetermined distance from screen 15. The mask 55 has a large number of apertures 57. A frame 59 supports the shadow mask 55. Screen 15 includes a plurality of metal-backed phosphors defining groups that each include three phosphor stripes, red, green and blue. Mask 55 includes a plurality of effective subregions 61, each with a plurality of slit apertures 57 for selecting the electron beam. Non-effective regions 63, which do not permit passage of electron beams are provided intermediate adjacent effective subregions 61. Each electron gun 27, 29, 31, 33 in the electron gun section 71 emits a single electron beam which is deflected horizontally and vertically at set periods $T_H$ and $T_V$ and caused to scan a set region of screen 15 by the corresponding main deflection yoke 37, 39, 41, 43. Each of the main deflection yokes is connected to a horizontal deflection device 65 and a vertical deflection device 67. In this process, vertical deflection is effected once for a number of occurrences of horizontal deflection, the corresponding auxiliary deflection yoke 45, 47, 49 or 51 connected to subsidiary deflection device 69 effects subsidiary deflection in synchronization with the vertical deflection by the main deflection yoke. This produces three electron beams 35R, 35G and 35B that are effectively separated at set intervals in the central plane of deflection by the main deflection yoke. The types of video signals input in the electron beams are varied by a video signal device 71. The three electron beams 35R, 35G and 35B that have been subjected to this subsidiary deflection are directed onto shadow mask 55 at individual set angles, pass through apertures 57 and strike and cause luminescence of selected phosphors on the screen. Thus, screen 15 is divided into subregions 73, 75, 77 and 79, each of which is separately scanned by electron beams from a particular electron gun 27 to 33. A timing chart of the scanning of subregions 73, 75, 77 and 79 is shown in FIG. 5.

Figure 5:
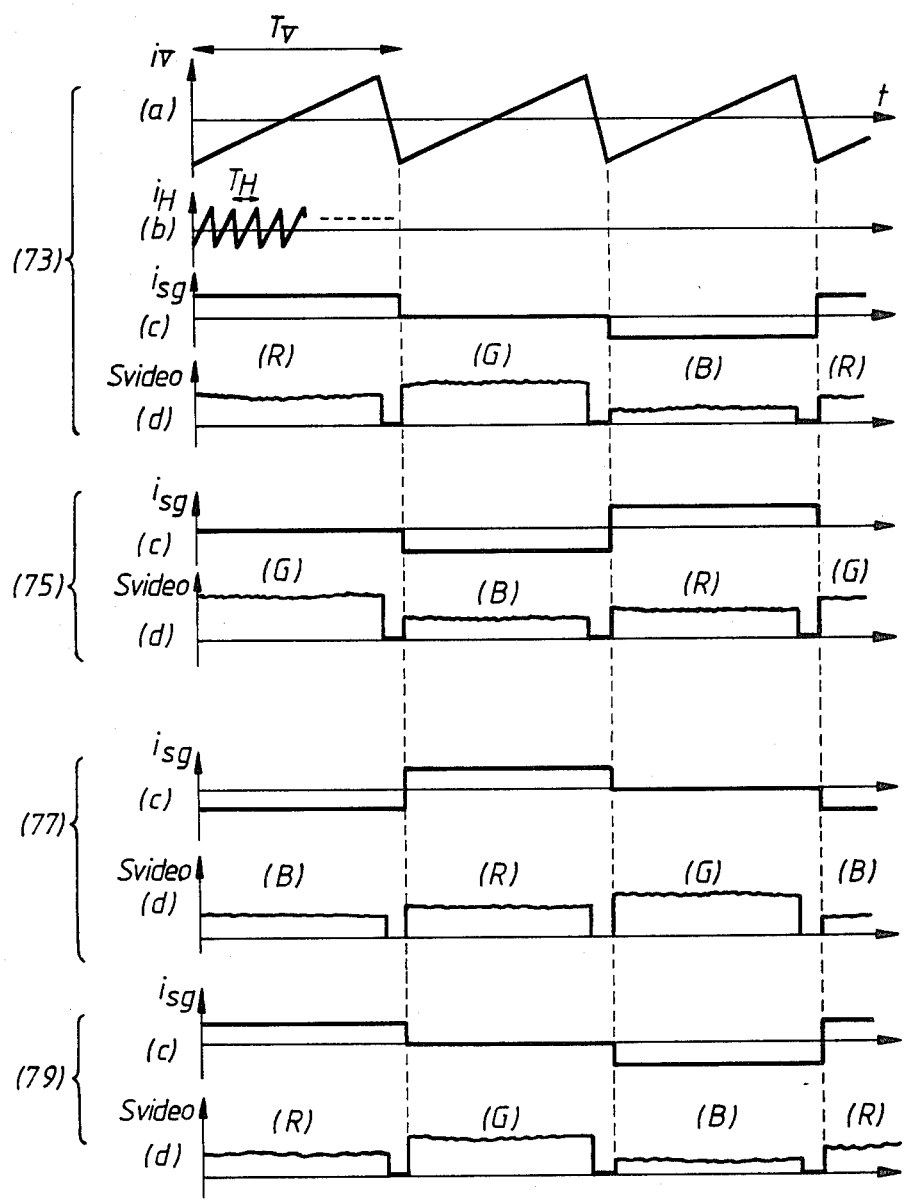
FIG. 5 is a timing chart showing signals that are supplied to different sections of the color cathode ray tube devices in the embodiment of FIG. 1.

In FIG. 5, (a) indicates main deflection yoke vertical deflection current $i_V$, (b) horizontal deflection current $i_H$, (c) auxiliary deflection yoke switching current $i_{sg}$ and (d) electron gun input video signals Svideo. The main deflection yoke vertical and horizontal deflection currents for regions 75, 77 and 79 are omitted, as they are the same as for region 73.

As may be seen from FIG. 5, the colors reproduced in the different subregions over the period of one vertical deflection are not all the same. Also, in a system such as this, since the essentially three electron beams that have been subjected to subsidiary deflection radiate in a manner such that the intervals between them spread, there is horizontal blurring of the screen's red, green and blue rasters. To counter this, either the output timing of the different video signals is adjusted or the horizontal deflection is suitably adjusted.

Figure 6:
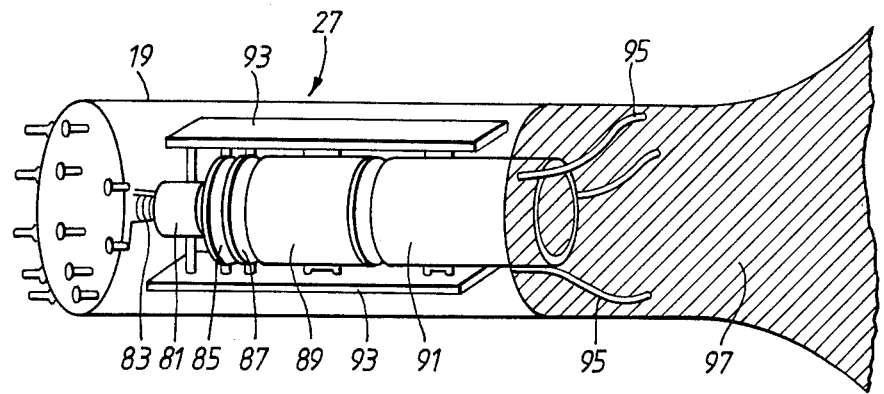
FIG. 6 is a schematic perspective view showing a unit electron gun suitable for use in the embodiment of FIG. 1, FIG. 7 (a) is a graph of the electron gun drive characteristics of the invention for the purpose of explanation of the invention, FIG. 7 (b) is a graph of conventional electron gun drive characteristics for the purpose of explanation of the invention.

As shown in FIG. 6, each electron gun, e.g. 27 in this embodiment, includes a cathode 81 incorporating a heater 83 for emitting a single electron beam 35, a 1st grid electrode (G1) 85, a 2nd grid electrode (G2) 87, a 3rd grid electrode (G3) 89 and a 4th grid electrode (G4) 91 for control, acceleration and focussing of the electron beam emitted from cathode 81 and insulating support elements 93 for supporting these electrodes. The 1st and 2nd electrodes 85, 87 are plate electrodes arranged next to one another, each with an aperture in their central portions, the 3rd electrode is a cylindrical electrode that is located next to the 2nd electrode 87, and the 4th electrode 91 is a cylindrical electrode which is located adjacent to the 3rd electrode 89. The inner wall of electrode 89 includes bulb spacers 95 attached thereto. The spacers 95 contact an inner conductive layer 97 to bring about imposition of a high anode voltage Eb.

Figure 7A:
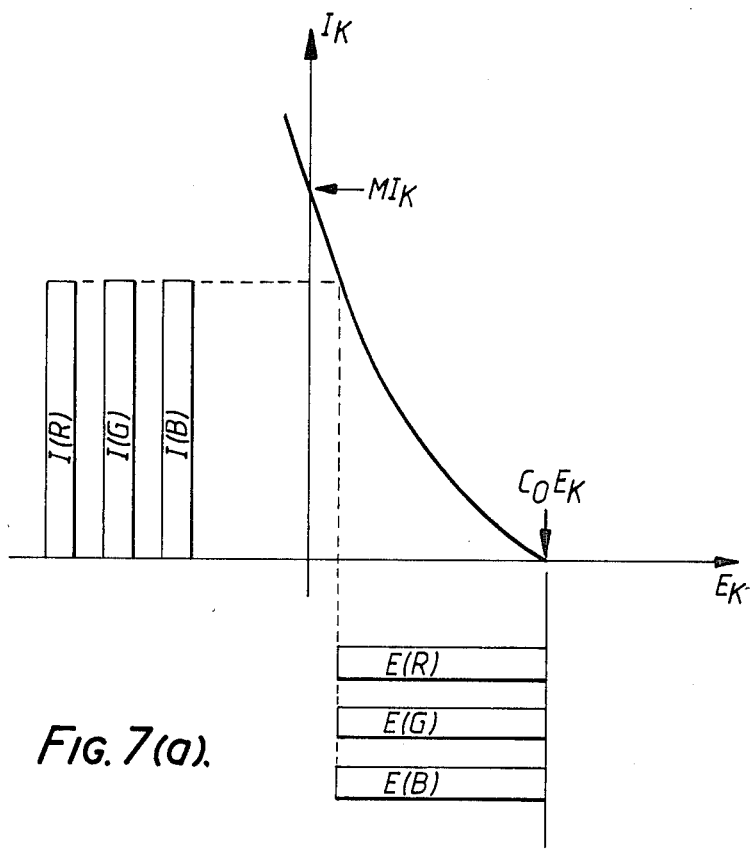
Figure 7B:
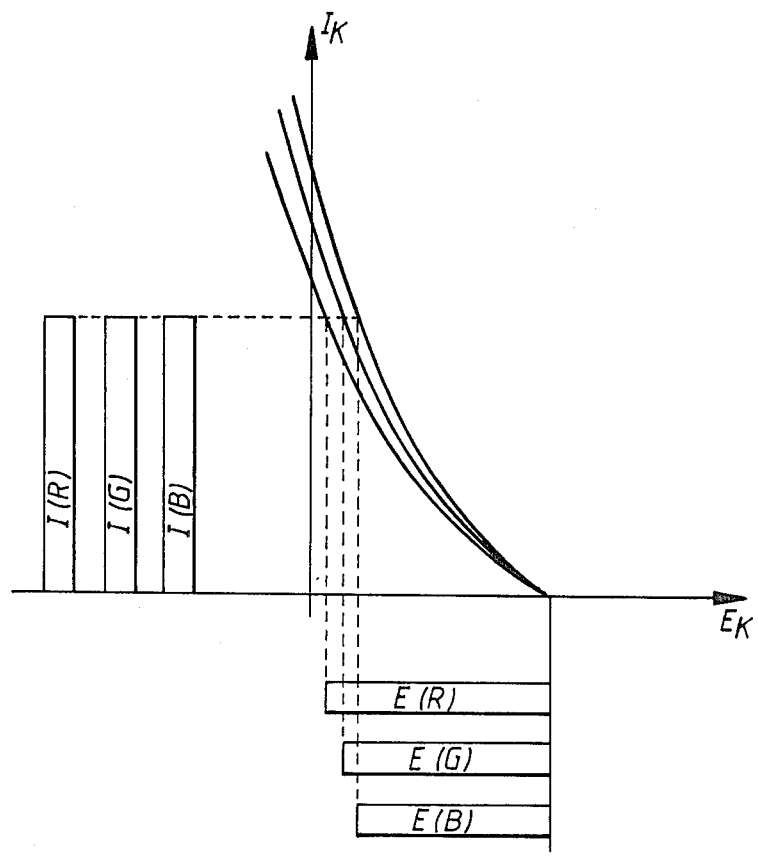

In the above electrode structure, the cathode is maintained at a cut-off potential of about 100 V and is supplied with input video signals, the 1st electrode 85 is at ground potential, the 2nd electrode 87 is at about 500 V, the 3rd electrode 89 is at a focussing potential of about 2-4 kV and the 4th electrode 91 is at a high anode potential of about 10-15 kV. As a result of this potential arrangement, an electron beam corresponding to a quantity determined by the magnitude of video signals, i.e., corresponding to the drive voltage, is emitted from the cathode and passes through a main electron lens defined by the 3rd electrode and the 4th electrode to be focussed on the screen. The cathode voltage Ek and the corresponding amount Ik of electron beam emission (the drive characteristic) of this electron gun is, for example, as shown in FIG. 7 (a). In this example, the Ek at which Ik=0 is cut-off CoEk and the current when Ek=0 is the maximum current MIk.

Generally in reproduction of white of a given color temperature there are differences depending on the luminescence efficiency of the phosphors of the three colors. However, for simplicity of description it is assumed that the amount of current of each of the three electron beams 35R, 35G and 35B for reproducing white is the same.

Thus, as shown in FIG. 7 (a), in the case of the invention in which color switching is effected using one electron gun, identical beam currents I(R), I(G) and I(B) can be obtained by imposition of the same drive voltage. Thus, there is no need for adjustment of the white balance in the different regions.

Figure 8:
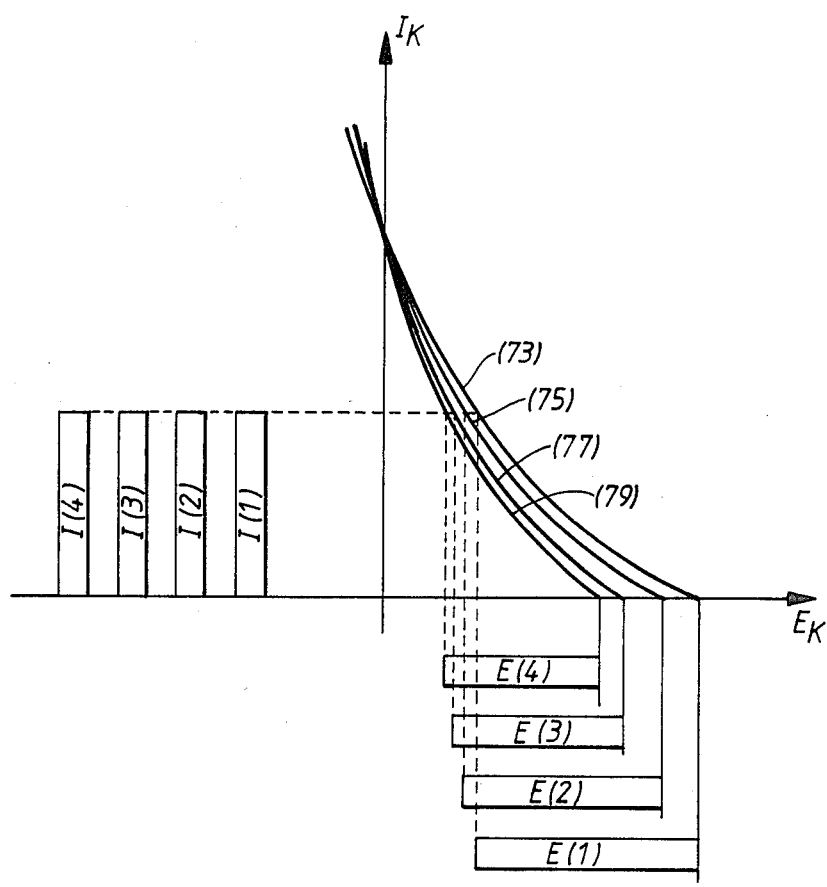
FIG. 8 is a graph of the electron gun drive characteristics of the invention for the purpose of explanation of the invention.

The above is achieved because in this invention a single electron gun is used to reproduce video signals of three colors. Therefore this is the same as if three electron guns with exactly the same drive characteristics were used. After this, it is simply necessary to match the brightness in the different regions. One way of doing this is to adjust the 2nd electrode potential and, as illustrated in FIG. 8, to adjust the drive voltages E(1), E(2), E(3) and E(4) imposed on the various electron guns in a manner such that the four electron guns 27, 29, 31 and 33 have a matching drive characteristic MIk and the same beam current is produced from the various cut-off voltages. Doing this results in the same beam current (intermediate brightness) being produced for each intermediate drive voltage of the four electron guns and the same maximum brightness (maximum current MIk) being produced in response to the maximum drive voltage of each of the four electron guns. Also, since the cut-off voltages of the four electron guns are individually adjusted, the minimum brightness (black level) also is the same. Thus, all brightness values, going from minimum brightness through intermediate brightness to maximum brightness, are matched in the four regions 73, 75, 77, 79 and also the white balance is exactly the same in the different regions.

As described above, adjustment of the brightness and white balance is extremely easy in the invention since only one electron gun is used for deflection scanning of each subregion. That is, since it is easy to adjust the white balance in any one subregion, adjustment of the brightness and white balance relative to other subregions and adjustment of absolute brightness and white balance is very easy.

In contrast to this, it is extremely difficult to achieve complete matching of brightness and white balance in a plurality of subregions with a color cathode ray tube which has a unitary screen section structure and an array of shadow mask type color cathode ray tubes with three electron guns, as in color cathode ray tubes that are in wide use at present. Since three electron guns generally each have different drive characteristics, it is necessary first, for example, to match the cut-off for the three guns. In this case, since the drive characteristics are as shown in FIG. 7 (b), it is necessary to alter the drive voltages E(R), E(G) and E(B) of the respective guns in certain ratios. Doing this for one set of electron guns is not particularly difficult. However, although the ratios of the drive voltages E(R), E(G) and E(B) can be determined for a particular set of three electron guns, the drive characteristics in another combination of three electron guns are different. Accordingly, the ratios are not the same, but vary for each different set of electron guns.

That is, the drive voltage ratios of three electron guns after adjustment of the white balance of a 1st subregion are different from the ratios which apply after adjustment of the white balance of a 2nd subregion. When this adjustment has been made, the brightness of the two subregions has to be re-adjusted. But, if the amount of current is changed by altering the drive characteristic or drive voltage of one electron gun of the 1st subregion, this results in collapse of the white balance in this region. Thus, the drive characteristic or drive voltage of the other two electron guns has to be altered in order to change the amount of current. Even if this procedure permits successful adjustment of the white balance, it is not guaranteed that there will be a good match between the resulting brightness of the 1st subregion (the total amount of current of the three electron guns) and the brightness of the 2nd subregion. As a result, adjustment of brightness and white balance always involves making a multitude of alternating adjustments of the different guns.

Thus, although adjustment of the white balance in individual subregions may not be all that difficult, bringing about a perfect match of the brightness and white balance in the different subregions, involving as it does repeated comparison of the subregions, is an extremely complex and difficult procedure.

Needless to say, although the screen section is divided into two vertical and two horizontal subregions in the embodiment described above, the invention is not limited to this, but the screen may be divided into n sections vertically and m sections horizontally (where n and m are integers).

Although the main deflection device for deflection in a given subregion and the auxiliary deflection device for making a single electron beam effectively three beams include and electromagnetic deflection is used in the above embodiment, the invention is not limited to this, but it is possible to use electrostatic deflection.

Also, the invention is not limited to an arrangement in which the main and auxiliary deflection devices are provided around the outside of necks in which electron guns are accommodated, as in the above embodiment, but the deflection devices may be provided inside the envelope.

Further, although the cut-off voltage was made the cathode voltage in the above embodiment, the invention is not limited to this, but the cut-off voltage may be the (G1) or the 2nd electrode potential and drive signals may be input to one or the other of (G1) and the 2nd electrode.

Also, although the vertical deflection period by the main deflection device and the subsidiary deflection period by the auxiliary deflection device were made coincident in the above embodiment, the invention is not limited to this, but the horizontal deflection period and the subsidiary deflection period may be made coincident.

If this is done, an image of one color is reproduced with one-time horizontal deflection. Thus, horizontal deflection must be effected three times in order to reproduce a three-color image. However, if nothing at all is done about vertical deflection, the three horizontal defection lines become displaced vertically, and it is therefore necessary to have a means for compensating the vertical displacement of the three horizontal deflection lines (or what is called "convergence" in the case of an ordinary three electron gun color cathode ray tube ). This is easily achievable by effecting subsidiary vertical deflection correction in synchronization with horizontal deflection periods by means of a 2nd auxiliary deflection coil like the auxiliary deflection coil by which a single electron beam is effectively made into three electron beams. A timing chart for one subregion when this is done is shown in FIG. 9, which is comparable to FIG. 5.

Figure 9:
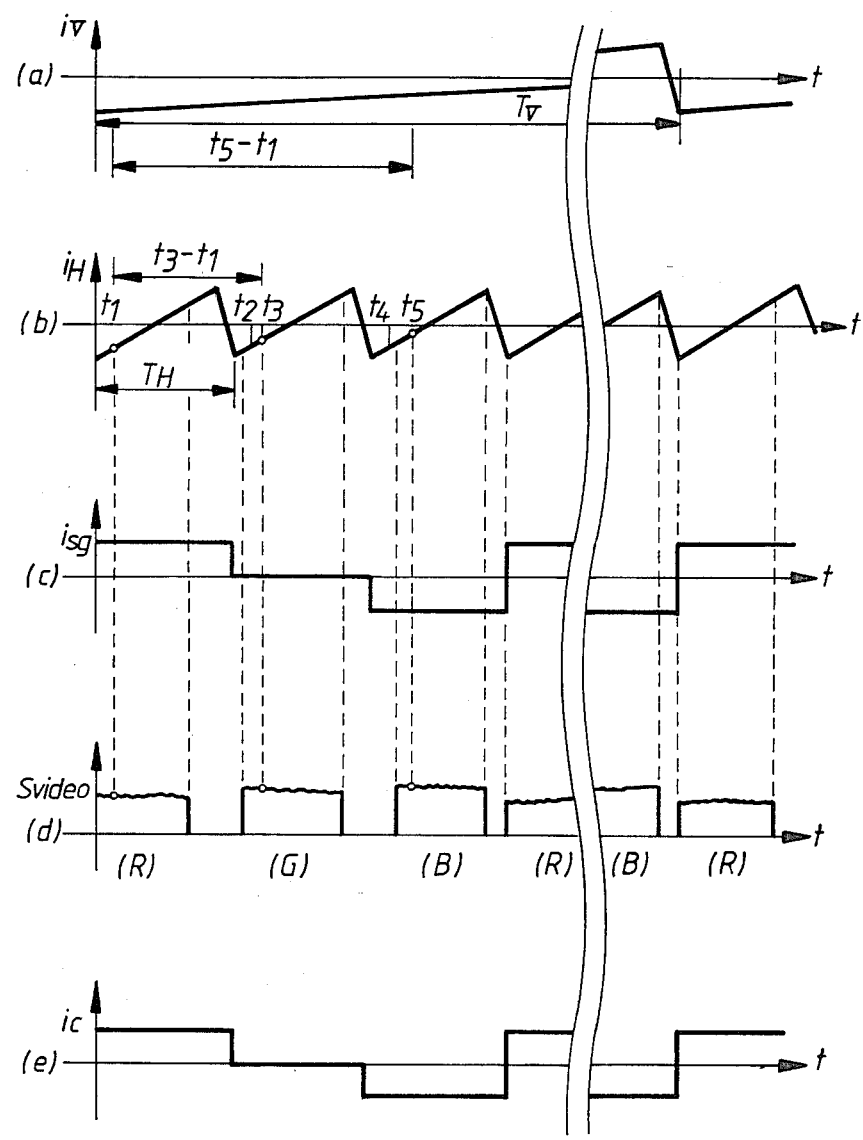
FIG. 9 is a timing chart showing signals supplied to different sections of a color cathode ray tube in another embodiment of the invention.

In FIG. 9, (a) is the main deflection yoke vertical deflection current $i_V$, (b) is the horizontal deflection current $i_H$, (c) is the auxiliary deflection coil's switching current $i_{sg}$, (d) indicates video signals Svideo and (e) is the correction current $i_c$ for vertical correction by the 2nd auxiliary deflection coil.

In this case, too, a color image can be reproduced by a single beam scanning each subregion and the white balance in the different subregions is easily matched as in the embodiment described earlier.

As described above, in a shadow mask type color cathode ray tube in which the screen section has a unitary structure and is subdivided into a plurality of separately scanned subregions, the invention permits the brightness, contrast and hue of the different subregions to be adjusted very easily. This results in a highly practical color cathode ray tube, since for each subregion, a single electron gun emits a single electron beam, and this beam is effectively made into a plurality of beams by being subjected to subsidiary deflection.

Since a shadow mask is used for color selection in the color cathode ray tube of the invention, color selection is easier and more reliable than in a system which does not use a shadow mask. There is the further advantage in terms of practical use. Since color switching periods can be matched to horizontal or vertical main deflection periods, there is no need for a very high color switching frequency and it is possible to readily effect color switching with existing electric circuits.

We claim:

1. A color cathode ray tube device, comprising:
   electron gun means including a plurality of unit electron guns each for generating a single electron beam;
   a screen including a plurality of subregions, one of the subregions corresponding to each of said unit electron guns for separate scanning by the electron beam from the corresponding unit electron gun, each of said subregions including a regular array of plural differently colored phosphors coated on said screen;
   mask means opposite said screen including apertures for passage of the electron beams;
   main deflection means including a plurality of main deflection devices each having a deflection center, one of the main deflection devices corresponding to each of said unit electron guns for separate scanning of each said subregion by the electron beam from the corresponding unit electron gun; and
   subsidiary deflection means including an auxiliary deflection device corresponding to each said unit electron gun for deflecting said single electron beams of said unit electron guns onto each deflection center of said main deflection devices for effectively making said single electron beam into a plurality of electron beams for irradiation of respective of the plural differently colored phosphors, wherein each said subsidiary deflection means comprises first means for deflecting the electron beam in a horizontal direction.

2. The device of claim 1 also including a first synchronization means for synchronizing the period of subsidiary deflection by each of said auxiliary deflection devices and the period of vertical deflection by each of said main deflection devices in each of said subregions, and video signal means for converting input video signals to a plurality of color video signals in synchronization with the deflection period of said subsidiary deflection means for inputting to each of said unit electron guns.

3. The device of claim 1 also including a second synchronization means for synchronizing the period of subsidiary deflection by each of said auxiliary deflection devices and the period of horizontal deflection by each of said main deflection devices in each of said subregions, and video signal means for converting input video signals to a plurality of color video signals in synchronization with the deflection period of said subsidiary deflection means for inputting to each of said unit electron guns.

4. The device of claim 1, wherein each said auxiliary device further comprises second. means for deflecting the electron beam in the other direction from the horizontal direction.

5. The device of claim 1, wherein said mask means includes a shadow mask and a frame supporting said shadow mask, said shadow mask being divided into a plurality of effective subregions, one subregion corresponding to each said unit electron guns, each of said effective subregions including a plurality of beam apertures at a predetermined pitch and non-effective regions positioned intermediate adjacent ones of the effective subregions which do not permit passage of electron beams.

* * * * *